June 7, 1960 J. G. WEEKS 2,940,036
APPARATUS FOR DYNAMICALLY GAGING RELAYS
Filed June 26, 1956 5 Sheets-Sheet 1

INVENTOR
J. G. WEEKS
BY C. S. Hamilton
ATTORNEY

FIG. 5

INVENTOR
J. G. WEEKS

INVENTOR
J. G. WEEKS
BY C.B. Hamilton
ATTORNEY

United States Patent Office 2,940,036
Patented June 7, 1960

2,940,036

APPARATUS FOR DYNAMICALLY GAGING RELAYS

John G. Weeks, Downers Grove, Ill., assignor to Western Electric Company, Incorporated, New York, N.Y., a corporation of New York Filed June 26, 1956, Ser. No. 593,880

15 Claims. (Cl. 324—28)

This invention relates to apparatus for dynamically gaging relays, and more particularly to apparatus for dynamically gaging wire spring relays and adjusting them.

In the manufacture of relays for use in telephonic or other electrical apparatus, it sometimes is necessary to adjust the biased position of the movable relay springs to provide the proper timing of the operation of contacts thereof relative to the final positions of armatures of the relays. Dynamically testing methods and apparatus have been provided in the past such as the methods and apparatus disclosed and claimed in copending applications Serials Nos. 357,875, 357,876 and 357,877, filed May 27, 1953, now Patents 2,805,388, 2,805,389 and 2,785,375, respectively, by R. W. Brown for "Methods of and Apparatus for Testing Contacts," and my copending application Serial No. 593,840, now Patent No. 2,840,780, filed simultaneously herewith. However, no apparatus has been known which would test the relays without artificial loading from transducers or the like, and also adjust the relays in accordance with the test results.

An object of the invention is to provide new and improved apparatus for testing relays dynamically.

Another object of the invention is to provide apparatus for testing relays dynamically without artificial loading of the relays or precise positioning.

A further object of the invention is to provide apparatus for testing relays in which the relays are tested, and automatically adjusting the relays in accordance with the tests.

In an apparatus illustrating certain features of the invention, a relay to be tested is operated, one pair of contacts of a plurality of pairs of contacts and a second pair of the contacts spaced substantially from the first pair are tested by gaging means, and the entire row of contacts is adjusted by adjusting means controlled by the gaging means.

In an apparatus illustrating the invention more specifically, a wire spring relay is energized to move a movable comb by an armature relative to a fixed comb, and current-measuring means measures the current of the relay coil. From the instant that an end pair of contacts change condition, pulses of a predetermined frequency are supplied to an electronic counter, which are stopped by a pulse initiated by the coil current as the armature is stopped by a core of the relay, at which latter point the rate of change of the coil current changes sharply from a negative slope to a positive slope. The counter sets a first memory circuit, and then a second pair of contacts are gaged to set the counter which sets a second memory circuit. The first memory circuit actuates a reversible, variable torque drive to bend a locating arm of the relay in a direction varying the first pair of contacts into adjustment, and the second memory circuit simultaneously actuates a second such drive to bend a second arm of the relay in such a direction and with such torque as to bring the second pair of contacts into adjustment. The apparatus then repeats the above-described cycle of operation until no further adjustment of the relay is needed.

A complete understanding of the invention may be obtained from the following detailed description of an apparatus forming a specific embodiment thereof, when read in conjunction with the appended drawings, in which.

Figure 1:
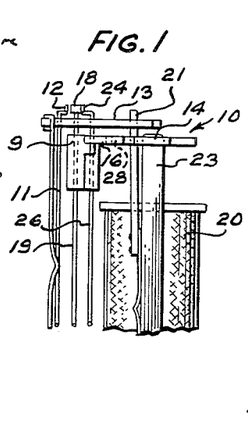
Figs. 1 and 2 are views of a wire spring relay to be tested and adjusted by apparatus forming embodiments of the invention.

Referring now in detail to the drawings, there is shown an apparatus for testing a wire spring relay 10 to determine whether or not a stationary comb 19 having contacts 18 is held in proper position by a core plate or locater 14 to provide proper operation of contacts 12 and 24 of movable combs 11 and 26 by a card 13. The stop or locater 14 having bendable arms 15 and 16 locates stationary contacts 18 of the comb 19, a molded block 9 of which is urged by spring tension against the ends of the arms 15 and 16. When a coil 20 of the relay is operated and energized, an armature 21 moves the card 13 in a direction such as to permit, through a bar 17 of the card, the contacts 12 to move toward the contacts 18 to move break contacts 24 through a bar 25 of the card 13, and the armature 21 to move against the core 23. In such movement of the armature, the break contacts 12 and 18 operate and then the armature engages the core 14, after which travel of the armature 21 and the card 13 stop. By measuring the time from the instant that the end contact 12, uppermost, as viewed in Fig. 2, engages the end contact 18 until the armature 21 engages the core 23, then measuring the time from the instant that the bottom contacts 12 and 18 engage and the point at which the armature 21 engages the core 23, and then comparing these times with a desired or standard value, whether or not the comb 19 is spaced properly by the locater 14 to provide optimum operation of the contacts 12 and 18 may be determined. Also, whether or not the comb 19 is in a position in which the line formed by the contacts 18 is slanted relative to the line formed by the contacts 12 may be determined. If necessary, the arms 15 and 16 of the locater 14, which are bendable, may be adjusted through slots 27 and 28 in the locater 14 to position the comb 19 precisely.

Figure 2:
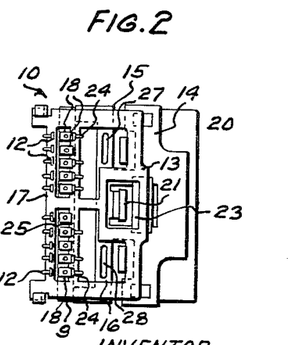
Figure 4:
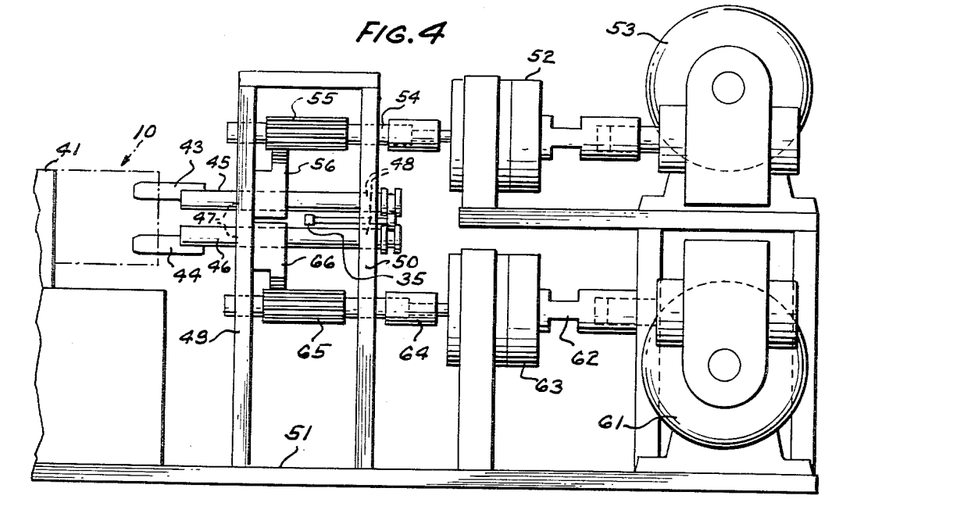
Fig. 4 is a fragmentary, front elevation of a portion of an apparatus forming one embodiment of the invention, and Figs. 5, 6, 7 and 8, when fitted together, are a wiring diagram of gaging and controlling circuits required for the apparatus shown in Fig. 4.

To test the relay 10, it is mounted in a holder 41 (Fig. 4) which connects the end pairs of contacts 12, 18 and 24 and the coil 20 into the circuit shown in Figs. 5 through 8. A manual pusher 35 is moved to the left, as viewed in Fig. 4, so as to move screwdriver blades 43 and 44 into the slots 27 and 28 (Fig. 2). The bits 43 and 44 are mounted in offset positions on shafts 45 and 46. The shafts are mounted in bearings 47 and 48 in fixed mounting plates 49 and 50 rigidly fixed on a base 51. When a magnetic, fluid clutch 52 is actuated sufficiently and a reversible, constant speed torque motor 53 supplying power to the clutch 52 is energized, the shaft 45 is driven, through a shaft 54, a pinion 55 keyed thereto and a gear segment 56 keyed to the shaft 45, with sufficient force to bend the arm 15 of the core plate or locater 14 beyond its elastic limit to locate the edge of the comb 19 adjacent to the arm 15 either closer to or farther from the core 23, depending, of course, on the direction in which the motor 53 is rotating. Similarly a reversible, constant speed torque motor 61 has an output shaft 62 connected to the input of a magnetic fluid clutch 63 connected to an output shaft 64. A pinion 65 keyed to the shaft 64 meshes with a gear segment 66 keyed to the shaft 46.

Figure 5:
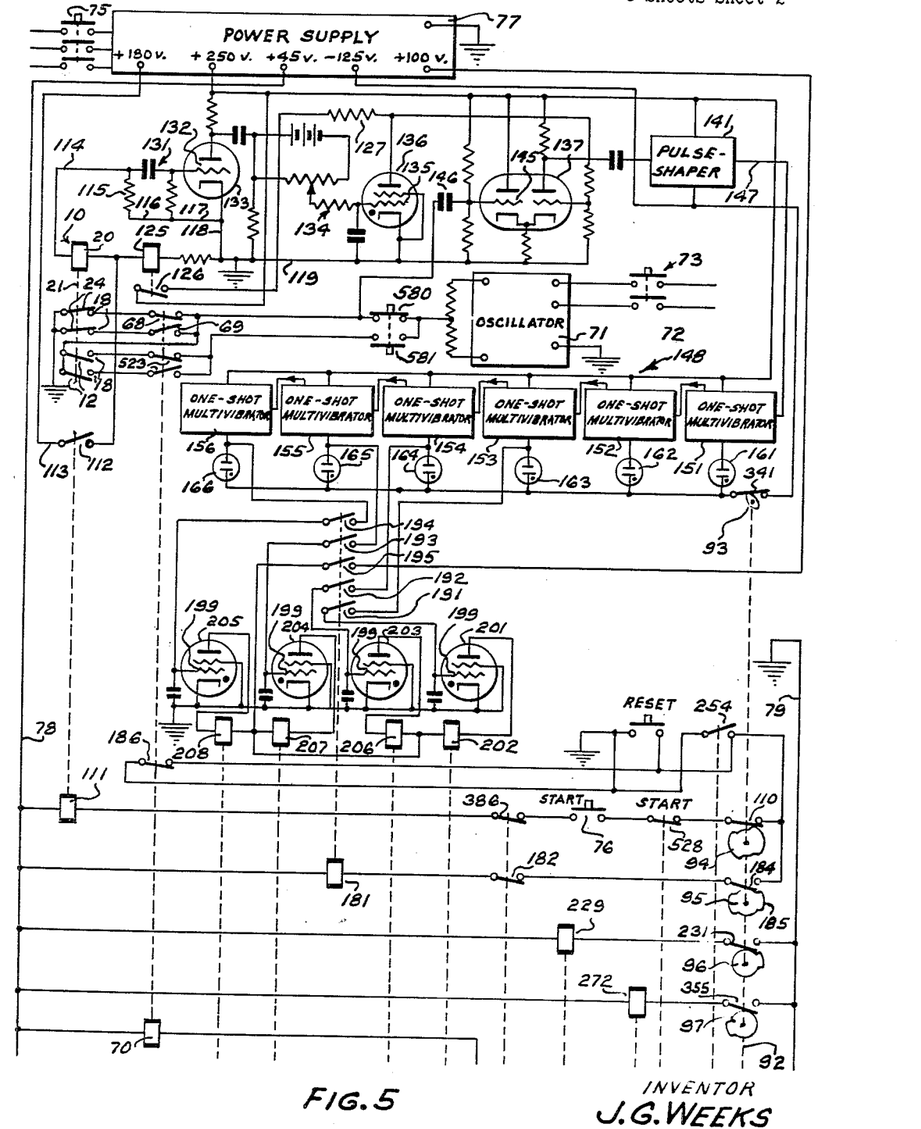
Figure 6:
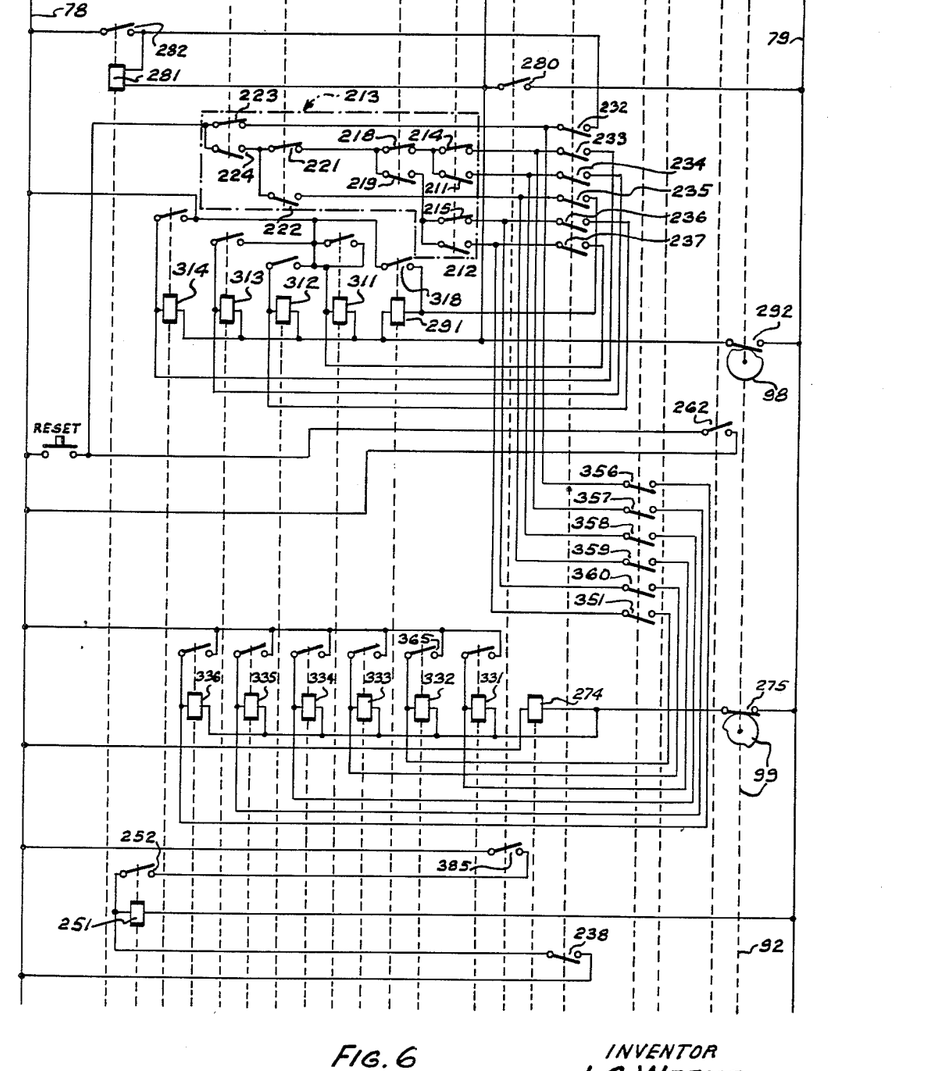
Figure 7:
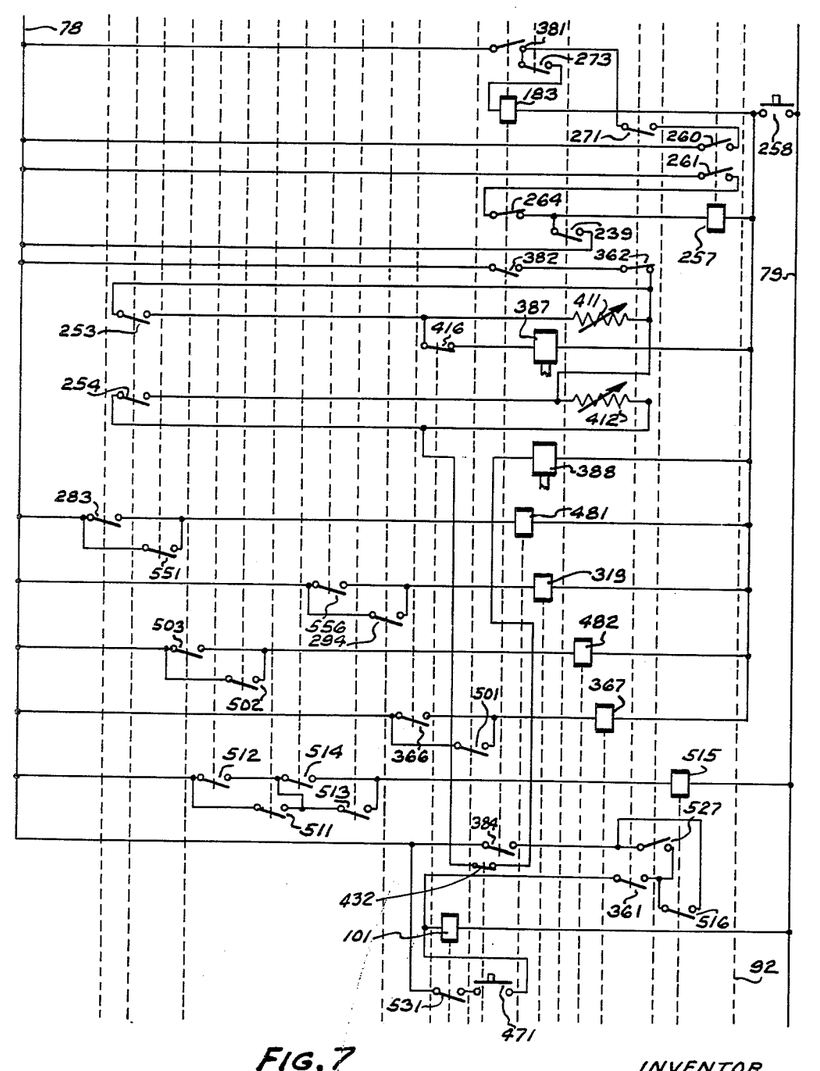

The upper and lower end pairs or sets of contacts 18 and 24, as viewed in Fig. 5, are connected through contacts 68 and 69, respectively, of a relay 70 to the output of an oscillator 71 of a predetermined frequency, preferably in the order of seventeen thousand kilocycles per second, supplied with power from a power line 72. Toggle switches 73, 75, 76, 258 and 522 then are closed to supply power to a power supply 77 and control power line conductors 78, 79, 80, 81, 82, 83 and 84. Power to the control power conductors starts a constant speed cam-driving motor 91 (Fig. 8) to turn a shaft 92 having switch-actuating cams 93, 94, 95, 96, 97, 98 and 99 keyed thereto. The power is supplied to the motor 91 through normally closed contacts 100 of a relay 101. The motor 91 turns the cams counterclockwise at a predetermined rate of speed.

When the switch 76 is closed, contacts 110 being closed by the cam 94, a gage-starting or test-starting relay 111 is energized to close contacts 112 to energize the test relay 10 through a conductor 113, the contacts 112, the relay winding 20, conductor 114, a resistor 115, conductors 116, 117 and 118 to a grounded conductor 119. The closing of contacts 112 also actuates a fast-operating relay 125 to close contacts 126 to a resistor 127. Voltage reflecting the current through the coil 20 is impressed through a differentiating network 131 on a grid 132 of a tube 133. The output of the tube 133 is supplied through a network 134 to a grid 135 of a thyratron tube 136 whose output is connected to one side of a gating tube 137. When the tube 136 is conductive, it blocks any output from the tube 137 to a pulse-shaping circuit 141 of a well known type. When the tube 136 is not conducting, pulses may be transmitted from the tube 137 to the circuit 141.

With the contacts 68 closed and the contacts 69 open, the instant that the uppermost contact 24, as viewed in Fig. 5, is moved away from the uppermost contact 18, the grounding shunt of the output of the oscillator 71 is removed and the pulses from the oscillator are impressed on a grid 145 of the gating tube 137 through a capacitor 146. The tube 137 then transmits amplified pulses from the oscillator to the pulse-shaper 141. The pulse-shaper 141 sharpens and amplifies the oscillator pulses, and transmits them through an output lead 147 to a counter 148 comprising one-shot multivibrators 151, 152, 153, 154, 155 and 156 connected in series with one another. Each time each of these multivibrators is pulsed twice, it sends an actuating pulse to the multivibrator to its left. Thus, each multivibrator acts as a binary counter. On being actuated by the first of two pulses or oscillations from the oscillator 71, the multivibrator 151 lights a gas-filled indicating lamp 161. On the next pulse, the multivibrator 151 sends one pulse to the multivibrator 152 which then lights a gas-filled indicating lamp 162. On the next two pulses to the multivibrator 151, it sends a second pulse to the multivibrator 152 which returns to initial condition and sends a pulse to the multivibrator 153, which lights a lamp 163. When the multivibrator 153 is pulsed twice, it sends a pulse to the multivibrator 154. Thus, on each fourth pulse from the oscillator, the multivibrator 152 sends a pulse to the multivibrator 153, on each eighth pulse from the oscillator, the multivibrator 153 sends its pulse to the multivibrator 154, which lights a lamp 164. The multivibrator 154 sends a pulse to the multivibrator 155 on each sixteenth pulse and the multivibrator 155 on the thirty-second pulse from the oscillator 71 sends an output pulse to the multivibrator 156. The multivibrator 156 lights a lamp 166 on the thirty-second pulse from the oscillator 71.

After the relay 10 has operated, a relay 181 is energized through contacts 182 of a relay 183 by closing of contacts 184 by a lobe 185 of the cam 95 and contacts 186 of the relay 70, which is deenergized at this time. The relay 181 closes contacts 191, 192, 193, 194 and 195. The contacts 191, 192, 193 and 194 are connected to outputs of the multivibrators 153, 154, 155 and 156, respectively, in parallel with the indicating lamps 163, 164, 165 and 166, and the counter 148 sends its potentials according to its setting by the gaging operation to the lamps 163, 164, 165 and 166 and the contacts 191, 192, 193 and 194. Thus, when the multivibrator 153 has been pulsed once or an odd number of times so that it is in an actuated or non-rest condition, a grid 199 of a thyratron tube 201 is damped and does not energize a relay 202. Similarly, when each of the multivibrators 154, 155 and 156 is in an actuated, rather than at a rest condition, a negative potential is applied to the grid 199 of the one of the thyratron tubes 203, 204 and 205 associated therewith to prevent firing of that tube and energization of a corresponding relay 206, 207 or 208. However, when any of the multivibrators 153, 154, 155 and 156 is in its initial or rest condition, which is present when it has been pulsed an even number of times or not at all, the thyratron tube and relay associated therewith is energized. When the relay 202 is energized, it closes contacts 211 and 212 in a relay tree 213 and opens break contacts 214 and 215. Similarly, energization of the relay 206 opens break contacts 218 and closes contacts 219, energization of the relay 207 opens break contacts 221 and closes contacts 222, and energization of the relay 208 opens break contacts 223 and closes contacts 224.

Figure 3:
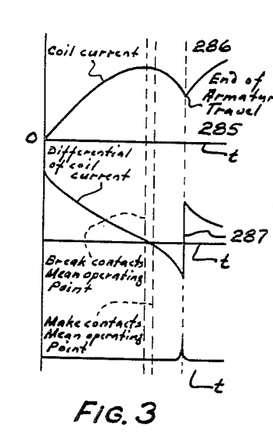
Fig. 3 is a series of charts illustrating characteristics of the relay shown in Figs. 1 and 2.

When the armature 21 strikes the relay core 23 and is stopped, the coil current of the relay 10 rises abruptly, which change is indicated by a point 285 on a curve 236 (Fig. 3). This rise is differentiated by the network 131 to form a pulse 287 to simultaneously pulse the grid 132 of the tube 133 positively to make the tube 133 conductive and drop its plate voltage. This fires the thyratron tube 136 to pulse the tube 137 to make its right-hand half non-conductive to block further pulses from the oscillator 71 to the counter 148. Thus, only the oscillations occurring between the instant of opening of the upper end contacts 18 and 24 and the striking of the core by the armature are fed to the counter 148.

After the counter 148 has been set and pulses from the oscillator 71 blocked off therefrom, the number of pulses in units of four are indicated thereon by the lamps 161, 162, 163, 164, 165 and 166. Each of the multivibrators changes when it is pulsed from one of an actuated or non-rest condition to an initial or rest condition to the other condition, and, on the next pulse thereto goes to its previous condition. With the multivibrators initially in the starting or at rest condition, if there were from four through seven pulses in the counting period, only the multivibrator 153 of the last four multivibrators is in a changed or actuated condition, only one pulse having been sent to the multivibrator 153 and none to the multivibrators 154, 155 and 156. If the counter pulses are from eight through eleven, only the condition of the multivibrator 154 of the multivibrators 153, 154, 155 and 156 is changed from its initial condition. From twelve through fifteen pulses, both the multivibrators 153 and 154 are in changed conditions. From sixteen through nineteen pulses, only the condition of multivibrator 155 of the multivibrators 153, 154, 155 and 156 is changed. From twenty through twenty-three pulses, only the multivibrators 153 and 155 are in changed conditions. From twenty-four through twenty-seven pulses, only the multivibrators 154 and 155 are in changed conditions. From twenty-eight through thirty-one pulses in the counting period, only multivibrators 153, 154 and 155 are in the changed or non-rest condition, and from thirty-two through thirty-five pulses, only multivibrator 156 is in the changed condition, it having been pulsed once.

Sometime after the counter 148 has been set, the cam 95 closes the contacts 184 to energize relay 181 to draw up contacts 191 to 195 to supply plate voltage to the thyratron amplifiers 201, 203, 204 and 205 through contacts 193 and the relays 202, 206, 207 and 208, respectively. The contacts 191, 192, 193 and 194 connect the outputs of multivibrators 153, 154, 155 and 156, respectively, to triggering grids 199 of the thyratrons 201, 203, 204 and 205, respectively. For each of multivibrators 153, 154, 155 and 156 that is in the non-rest condition, a negative or non-firing potential is applied to the grid 199 connected to the output thereof and the thyratron tube multivibrators in the at rest or non-pulsed condition, the grid 199 connected to the output thereof is at a triggering potential and the tube 201, 203, 205 or 206 is fired to actuate the relay 202, 206, 207 or 208 in series therewith.

Assuming that only the multivibrator 153 is in an actuated condition when the relay 181 is energized, only the relay 202 of the relays 202, 206, 207 and 208 is not energized. The cam 96 closed its contacts 231 shortly after cam 95 closed contacts 184. Relay 229 having been energized by cam 96 closing contacts 231, it closes the contacts 232, 233, 234, 235, 236, 237, 238, 239, 240 and 241 to memory circuit relays 281, 291, 311, 312, 313 and opens contacts 249. The relay 257 is energized by the relay 229 to close contacts 262, and a circuit only to the relay 291 is made, through contacts 262, 224, 222 and 235. Then the cam 98 closes contacts 292, and the relay 291 pulls up to close holding contacts 318, close contacts 294 to energize a relay 319, and open contacts 295 to set the time operation of timer 297. Then the cam 96 permits the contacts 231 to open to drop out the relay 229. This drops out relay 251. However, the relay 291 remains energized through its holding contacts 318. The relay 70 is energized when the cam 98 closes contacts 292.

Then the cam 95 opens contacts 184 to drop out the relay 181. The cam 94 then opens the contacts 110 to drop out the relay 111, which drops out the test relay 10. Then cam 99 opens contacts 275 to drop out any of relays 331, 332, 333, 334, 335 and 336 forming a second memory circuit, and relay 274, which may have been energized by the counter 148. Then the cam 93 opens contacts 341 to reset to zero the counter 148 and recloses the contacts 341. At this point, the cam motor 91 has traveled substantially one-half of a revolution, and, as it continues to turn, the cam switch 110 is reclosed to bring in relay 111 which actuates the fast relay 125 and the test relay 10. The test relay pulls up and, after the initial surge of current thereto in starting the movement of the armature, the fast relay 125 closes its contacts 126. This prevents falsely pulsing the tube 136.

At this time, the cam contacts 292 still being closed, the relay 70 is energized to hold contacts 68 open and contacts 69 closed so that the gaging will be conducted on the lower pair of contacts 18 and 24. Then the lower contacts 18 and 24 open to remove ground from the output of the oscillator 71, and the pulses from the oscillator go through the gating tube 137 to actuate the counter 148 until the armature 21 strikes the core 23 of the relay 10, at which time the differentiated current surge through the coil 20 of the relay 10 actuates the tube 133 to fire the thyratron tube 136, which makes the gating tube 137 block further pulses from the oscillator 71. The counter 148 now is set in accordance with the period of time between the operation of the lowermost contacts 18 and 24 and the end of the travel of the armature 21.

Then the cam switch contacts 184 are closed to energize relay 181 to supply plate voltage to the thyratrons 201, 203, 204 and 205 and connect the outputs of the counter multivibrators 153, 154, 155 and 156 to the triggering grids 199 of the thyratrons 201, 203, 204 and 205. Assuming that in the setting of the counter 148, it received between sixteen and nineteen pulses so that only the multivibrator 155 in its actuated condition, only the grid 99 of the thyratron tube 204 has a negative or non-firing potential thereon so that only this thyratron tube is not fired. Hence, only relays 202, 206 and 208 are energized. This sets up a path to the relay 332 through contacts 262, 224, 221, 219 and 212 to contacts 351 of relay 272. Then cam 97 closes contacts 335 to energize the relay 272 to close the contacts 351 and contacts 271, 356, 357, 358, 359, 360 and 361 and open contacts 362. Then, the cam 99 closes contacts 275 and the relay 332 is energized, locks up through its holding contacts 365 and closes contacts 366 to energize relay 367. The relay 367 closes contacts 371 to a main field winding 372 and a starting field winding 373 of the motor 61 to start the motor 61 in a predetermined direction. The relay 367 also closes contacts 374 to an outside of limits lamp 375.

The energization of the relay 274 closes the contacts 273 to energize relay 183 to lock itself in through contacts 381, open contacts 264 to drop out relay 257, close contacts 382 to clutch windings 387 and 388, close contacts 384 to relay 101, close contacts 385 to relay 251, close contacts 280 to the relay 281, open contacts 182 to drop out relay 181 and open contacts 386 to drop out relay 111. Then cam 97 opens contacts 355 to drop out relay 272 to open contacts 271 and close contacts 362 to apply slack-takeup torque to clutch windings 387 and 388 of clutches 52 and 63. The relay 272 also opens contacts 361 to relay 101. Then as the cam motor 91 nears the end of its first revolution, first the cam 98 opens the contacts 292, which has no effect at this time, and then the cam 93 opens contacts 341 momentarily to reset the counter 148.

Then cam 96 closes contacts 231 to energize relay 229 to open contacts 239 and 240 to start timers 297 and 395. The relay 229 also energizes relay 251, which locks in through contacts 252 and 385 and closes contacts 253 and 254 to shunt adjustable resistors 411 and 412 to the clutch coils 387 and 388, and simultaneously closes contacts 242 to supply power to the timers 297 and 395 to start them. The full forces of the clutches 52 and 63 are now exerted to transmit torques from the motors 53 and 61 to the bits or blades 43 and 44. The bit 43 now bends the arm 15 of the locater 14 in a clockwise direction, as viewed in Fig. 2, to move the comb 19 in a direction such as to increase the time between the opening of the upper contacts 18 and 24, as viewed in Figs. 2 and 5, and the end of the travel of the armature 21. The bit 44 simultaneously starts to bend the other arm 16 of the locater 14 in a counter-clockwise direction, as viewed in Fig. 2, to decrease the time between opening of the lower contacts 18 and 24 and the end of the travel of the armature 21. When the timer 297 times out, it actuates relay 415 to open contacts 416 to deenergize the clutch winding 387 to stop further bending of the arm 15. This time is determined by the grid leak resistance-capacitance network 421 including a capacitor 422 and resistors 423, 296, if in, and 424. The time is lengthened if either relay 281 or relay 291 has been set energized by the counter 148, the relay 281 being set if the operation of upper contacts 18 and 24 had been greatly too long or above maximum limits and the relay 291 having been set if the operation of the upper contacts 18 and 24 was greatly too short or below minimum limits. In the above-described example, the time between operation of the upper contacts 18 and 24, as viewed in Fig. 5, was substantially below minimum so that the relay 291 was operated to make the bending or adjusting time maximum.

Similarly, when the timer 395 times out, it supplies current to a relay 431 to open contacts 432 to deenergize clutch winding 388. This stops further bending of the arm 16. The timing period of the timer 395 is determined by a grid leak resistance-capacitance network 451 including a capacitor 452 and resistors 453, 454, 455 and 456. If the counter 148 had been set by a greatly too short a period in gaging the lower contacts 18 and 24, as viewed in Fig. 5, to set the relay 331, or by a greatly too long period to set the relay 336, either contacts 461 or 462 would be open to break the shunt of the resistor 455 to make the timing period of the timer 395 maximum. However, in the above-described example, neither of the relays 331 and 336 were set so that the timing period of the timer 461 was shorter. Hence, the bending of the arm 16 of the locater 14 was less than if the timer 395 had been set for its maximum timing period.

After a period of time greater from the start of the timers 297 and 395 than the maximum period of time of these timers, the cam 96 reopens the contacts 231 to drop out relay 229. Then cam 99 opens contacts 275 to drop out relay 274, which drops out relay 183 to drop out relay 251 by opening contacts 385 in the holding circuit of the relay 251. Then cam 98 opens contacts 292 to drop out the relay 291, the contacts 280 having been opened by deenergization of relay 183.

Figure 8:
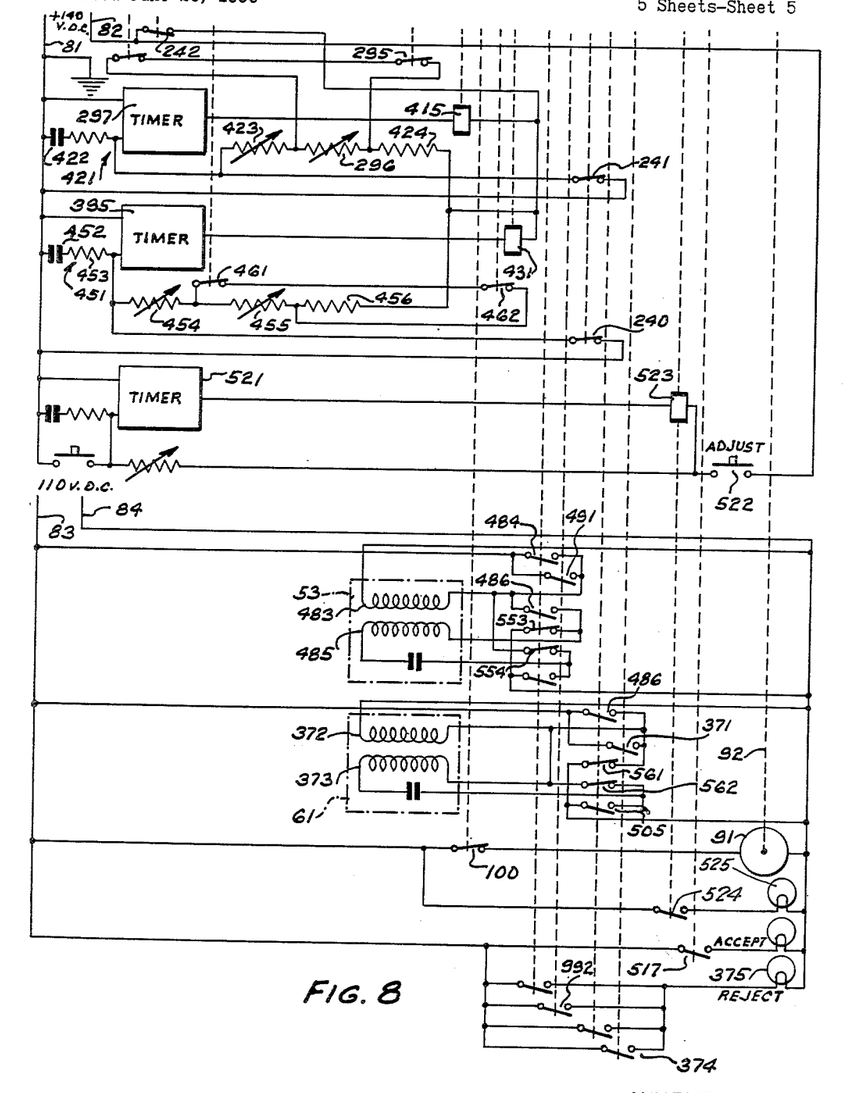

The cam motor 91 continues to be driven and the relay 10 is gaged and adjusted repeatedly in cycles as described above until, in one gaging cycle, none of relays 281, 314, 335 and 336 are set and either relay 312 or relay 313 and either relay 333 or relay 334 are set by the settings of the counter 148 in that gaging cycle. When such settings of the counter occur, it means that both upper and lower sets of contacts 18 and 24 operate at a point within allowable range. Also none of the relays 281, 314, 335 and 336 have been set so that neither of relays 481 and 482 are energized, contacts 484 to the motor windings 483 and 485 of motor 53 are open and contacts 486 to motor windings 372 and 373 of motor 61 are open. Also, assuming that either relays 291 or relay 311 and either of relay 331 and 332 have been energized, contacts 366 and 501 are open so that relay 367 is deenergized and contacts 502 and 503 of the relays 335 and 336 are open so that relay 482 is kept deenergized to keep open contacts 486 and 505. Thus, the motors are kept deenergized and no further adjusting occurs. Also, when the relay 10 is in proper adjustment, one of the relays 311 and 312 and one of the relays 333 and 334 will be energized so that one of contacts 511 and 512 of the relays 312 and 313 and one of contacts 513 and 514 of the relays 333 and 334 will be closed. This energizes a relay 515 to close contacts 516 and 517 to the relay 101 and an "accept" signal lamp 518. Closure of the contacts 516 energizes the relay 101 to close holding contacts 531 and open contacts in proper adjusting direction to reduce the operating time. However, if the operating time of the upper contacts 18 and 24 is too short, one relay 291 or 311 is energized to close either contacts 294 or contacts 556 to energize relay 319 to close contacts 491 to energize the motor 53 in the opposite direction, the relays 281 and 314 both being deenergized so that the relay 481 remains deenergized to keep the motor direction controlling contacts 486, 552, 553 and 554 in the non-operated conditions as they are shown in Fig. 8. Similarly, the relays 367 and 482 control directions of the motor 61 for adjusting the lower set of contacts 18 and 24, the motor 61 being run through contacts 371 and 505 in one direction to reduce contact operated time when either the relay 335 or the relay 336 is operated to energize the relay 482 and being energized to run in opposite direction through contacts 561 and 562 when the relay 367 is energized by operation of either relay 331 or relay 332.

The above-described apparatus may be set by opening manual switch contacts 581 and closing contacts 582 to gage and adjust the relay 10 in accordance with the operations of end normally open contacts 12 and 18. The opening of switch contacts 581 takes the end sets of contacts 100 to the cam motor 91 to stop the motor 91.

Thus, the apparatus repeatedly gages and adjusts and then stops, after which the relay 10 is removed, another relay to be tested is inserted into the apparatus and the switch 471 is opened to drop out relay 101 to restart the motor 91. Then, the switch 471 is reclosed.

When a timer 521 times out, a manual switch 522 having been closed at the start of the test, a relay 523 is energized to close contacts 524 to a lamp 525 and close contacts 526 and 527 and open contacts 528 to stop the cam motor 91. The timer 521 is set at a time sufficient to make several gaging and adjustment cycles, and, in most cases, relays 10 not adjusted properly in this time require different types of adjustment than that provided by this apparatus.

If only one of the two sets of contacts 18 and 24 are not operating within limits, only the arm 15 or 16 adjacent thereto will be adjusted, the motor 53 or 61 being deenergized. Also, if the upper set of contacts 18 and 24 have too long an operating time one of the relays 281 and 314 will operate to close either contacts 283 or contacts 551 to energize relay 481 to close contacts 484, 486 and 552 and open contacts 553 and 554 to drive the motor 53 in the contacts 18 and 24 out of the testing circuit and the closing of contacts 581 of the switch places the end sets of normally open contacts 12 and 18 in series with the oscillator 71, a normally closed contact 582 and a normally open contact 583 of the relay 70 and the grid 145 of the gating tube 137. The apparatus operates the same as before except that the output of the oscillator 71, instead of being initially grounded, merely is blocked from the grid 135 by the upper contacts 12 and 18 or the lower contacts 12 and 18, depending on whether the apparatus is in its first quarter cycle or second quarter cycle, until the contacts 12 and 18 close and the period measured are the points at which the contacts 12 and 18 close to the end of the travel of the armature 21 as it strike the core 23. The arms 15 and 16 are adjusted in the same direction for too long gaged periods of one of the normally open contacts 12 and 18 as too long a gaged period of normally closed contacts 18 and 24 at the same end of the rows of contacts 12, 18 and 24, and also is adjusted in the same direction for too short gaged periods of the normally open contacts as too short gaged periods of the normally closed contacts at the same end of the rows of contacts.

The above-described apparatus quickly and precisely measures distance of armature travel beyond contact operation through the operating times of these elements, since the armature velocity is known, and does so while the relays are under no artificial load and without precise positioning of the relay relative to the device insofar as the testing function is concerned. The apparatus repeatedly gages, and adjusts the relay 10 so that the relay is brought precisely to adjustment.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for dynamically gaging relays comprising means for energizing the relay to cause an armature thereof to sequentially operate a pair of contacts thereof and then travel to a stop thereof, a pulse-operated counter, a pulse source of a known frequency and gating means operable by operation of the contacts for connecting the source to the counter and also operable by the relay as the armature reaches the stop for disconnecting the counter from the pulse source, and means controlled by the counter for adjusting the contacts in accordance with the setting of the counter.

2. An apparatus for gaging and adjusting relays having sets of contacts arranged in a row comprising first means for measuring the operating time of a set of contacts of a relay at one end of a row, second means operable alternately with the first measuring means for measuring the operating time of a set of contacts of the relay at the other end of the row, means operable by the first measuring means for adjusting the relay, and means operable by the second measuring means for adjusting the relay.

3. An apparatus for gaging and adjusting relays having sets of contacts arranged in a row comprising means for measuring the operating time of a set of contacts of a relay at one end of a row, means operable alternately with the measuring means for measuring the operating time of a set of contacts of the relay at the other end of the row, and means operable by the first-mentioned measuring means and the second-mentioned measuring means for adjusting the relay.

4. An apparatus for gaging and adjusting a relay having an operating coil, an armature, a row of fixed contacts, a row of movable contacts biased toward engagement with the fixed row of contacts, a card normally biased to a position holding the movable contacts away from the fixed contacts and a yoke having adjustable arms holding the fixed row of contacts at opposite ends of the row, which comprises first reversible torque motor means for bending one arm of the yoke, second reversible torque motor means for bending the other arm of the yoke, means for gaging the contacts at one end of the rows for actuating the first torque motor means, and means for gaging the contacts at the other end of the rows for actuating the second torque motor means.

5. An apparatus for gaging and adjusting a relay having an operating coil, an armature, a row of fixed contacts, a row of movable contacts biased toward engagement with the fixed row of contacts, a card normally biased to a position holding the movable contacts way from the fixed contacts and a yoke having adjustable arms holding the fixed row of contacts at opposite ends of the row, which comprises first reversible means for adjusting one arm of the yoke, second reversible means for adjusting the other arm of the yoke, means for gaging the contacts at one end of the rows for actuating the first-mentioned adjusting means, and means for gaging the contacts at the other end of the rows for actuating the second-mentioned adjusting means.

6. An apparatus for gaging and adjusting a relay having an operating coil, an armature, a row of fixed contacts, a row of movable contacts biased toward engagement with the fixed row of contacts, a card normally biased to a position holding the movable contacts away from the fixed contacts and a yoke having adjustable arms holding the fixed row of contacts at opposite ends of the row, which comprises first reversible means for adjusting one arm of the yoke, second reversible means for adjusting the other arm of the yoke, memory means for gaging the contacts at one end of the rows, means responsive to the memory means for actuating the first adjusting means, a second memory means for gaging the contacts at the other end of the rows, and means responsive to the second memory means for actuating the second adjusting means.

7. An apparatus for gaging and adjusting a relay having an operating coil, an armature, contacts, and an adjustable device for locating the unoperated positions of the contacts, which comprises reversible means for adjusting the adjustable device, means for gaging the contacts, memory means responsive to the gaging means, and means responsive to the memory means for actuating the adjusting means.

8. An apparatus for gaging relay contacts comprising means for periodically applying an energizing voltage to a coil of an adjustable relay to cause the relay to move an armature thereof to sequentially change conditions of a plurality of sets of contacts thereof and move the armature against a stop of the relay, whereby there is an abrupt increase of current in the coil, an electronic counter, an oscillator of a predetermined frequency, means responsive to the abrupt increase of current in the coil for uncoupling the oscillator from the counter, pulsing means, means for alternately connecting the pulsing means to alternate sets of contacts on alternate energizations of the relay, means operable by the pulsing means when actuated by operation of the set of contacts connected thereto for coupling the oscillator to the counter, means operable in proportion to the amount of time the counter is energized greater than a predetermined amount for adjusting the relay in one direction, and means operable in proportion to the amount of time the counter is energized less than said predetermined period of time for adjusting the relay in the other direction.

9. An apparatus for gaging relay contacts, comprising means for applying a energizing voltage to a coil of a relay to cause the relay to move an armature thereof to sequentially change conditions of a set of contacts thereof and move the armature against a stop of the relay, whereby there is an abrupt increase of current in the coil as the armature is moved against the stop, an electronic counter, an oscillator of a predetermined frequency, means responsive to the abrupt increase of current in the coil for uncoupling the oscillator from the counter, means operable by operation of the set of contacts connected thereto for coupling the oscillator to the counter, means operable in proportion to the amount of time the counter is energized greater than a predetermined amount for adjusting the relay in one direction, and means operable in proportion to the amount of time the counter is energized less than said predetermined period of time for adjusting the relay in the other direction.

10. An apparatus for adjusting the space between a pair of spaced relay contacts, comprising means for measuring the time of operation of said relay contacts, means for adjusting the space between said relay contacts, and means controlled by said time measuring means for operating said adjusting means.

11. An apparatus for adjusting the spacing between contacts of a relay, which comprises a counter, an oscillator for applying constant frequency pulses to the counter, means for normally blocking the application of said pulses to the counter, means responsive to the operation of the relay under test for releasing said blocking means, means responsive to the completion of operation of said relay contacts for reestablishing said blocking means, means actuated in accordance with the operation of the counter for storing information indicative of the time of operation of said relay, means for adjusting the spacing of the relay contacts, and means operated by the storing means for accordingly operating said adjusting means.

12. An apparatus for adjusting the spacing between contacts of a relay under test, which comprises an oscillator for producing constant frequency pulses, a multi-stage counter, means for applying the output of the oscillator to the counter for the period of operation of said relay contacts, a series of memory devices, means controlled by the energized stage of the counter for selectively operating one of said memory devices, means for adjusting the spacing of the contacts, and means controlled by said operated memory device for actuating said adjusting means.

13. An apparatus for adjusting the space between a pair of relay contacts, which comprises means for measuring the time of operation of the relay contacts, a first relay circuit indicative of relay contacts that are too widely spaced, a second relay circuit indicative of relay contacts that are too closely spaced, a third relay circuit indicative of relay contacts that are within predetermined limits, a counter, means responsive to the time of operation of the relay contacts for actuating the counter, means operated by the counter for actuating one of said relay circuits in accordance with time of operation of said relay contacts, means for adjusting the spacing between said relay contacts, and means operated by said first and second relay circuits for actuating said adjusting means.

14. An apparatus for adjusting the spacing between contacts of a relay under test, which comprises means for engaging and adjusting the spacing between said relay contacts, a timer for controlling the time of operation of said adjusting means, means for measuring the time of operation of said relay contacts, a series of storage circuits selectively operated in accordance with the operation of said time measuring means, and means controlled by said storage circuits for varying the time of operation of said timer.

15. An apparatus for adjusting the spacings between two sets of contacts of a relay, which comprises means for successively measuring the time of operation of each set of relay contacts, a first series of storage means controlled by said measuring means selectively operated in accordance with the time of operation of said second set of relay contacts, a second series of storage means controlled by said measuring means and selectively operated in accordance with the time of operation of said second set of relay contacts, a pair of adjusting means for varying the spacing of said two sets of relay contacts, and means controlled by said first and second storage means for simultaneously operating said adjusting means in accordance with the operated storage means.

References Cited in the file of this patent

UNITED STATES PATENTS

| | | |
|---|---|---|
| 2,364,989 | Mallina | Dec. 12, 1944 |
| 2,494,863 | Dietz | Jan. 17, 1950 |
| 2,575,087 | Baker | Nov. 13, 1951 |
| 2,806,186 | Brown | Sept. 10, 1957 |